United States Patent [19]
Tazaki et al.

[11] Patent Number: 5,560,674
[45] Date of Patent: Oct. 1, 1996

[54] VEHICLE BODY FRAME

[75] Inventors: Hiroshi Tazaki; Kenjyu Kurino, both of Hiroshima; Kuniaki Nagao, Hiroshima-ken; Kozo Hirota, Hiroshima; Koji Tobita, Hiroshima-ken, all of Japan

[73] Assignee: Mazda Motor Corporation, Hiroshima, Japan

[21] Appl. No.: 483,838

[22] Filed: Jun. 15, 1995

Related U.S. Application Data

[63] Continuation of Ser. No. 72,384, Jun. 7, 1993, abandoned.

[30] Foreign Application Priority Data

Jun. 9, 1992 [JP] Japan ...................................... 4-149572

[51] Int. Cl.⁶ .................................................. B62D 27/00
[52] U.S. Cl. .............................. 296/203; 296/30; 296/194
[58] Field of Search .................................. 296/194, 196, 296/197, 203, 204, 209, 29, 30

[56] References Cited

U.S. PATENT DOCUMENTS

| | | |
|---|---|---|
| 2,139,750 | 12/1938 | Hicks . |
| 3,419,303 | 12/1968 | Eggert, Jr. et al. ..................... 296/204 |
| 4,068,884 | 1/1978 | Wantanabe et al. ..................... 296/204 |
| 4,471,992 | 9/1984 | Matsuura et al. ....................... 296/209 |
| 4,615,558 | 10/1986 | Nakamura et al. ................. 296/209 X |
| 4,848,835 | 7/1989 | De Rees .................................... 296/204 |
| 4,883,309 | 11/1989 | Miyazaki et al. ....................... 296/194 |
| 5,011,201 | 4/1991 | Takahashi et al. .................. 296/204 X |
| 5,129,700 | 7/1992 | Trevisan et al. ......................... 296/196 |

FOREIGN PATENT DOCUMENTS

| | | |
|---|---|---|
| 0142581 | 5/1985 | European Pat. Off. . |
| 59-114175 | 7/1984 | Japan . |
| 63-235174 | 9/1988 | Japan . |
| 247176 | 10/1988 | Japan .................................... 296/204 |
| 47684 | 2/1989 | Japan .................................... 296/204 |
| 132474 | 5/1989 | Japan .................................... 296/194 |

*Primary Examiner*—Dean Kramer
*Attorney, Agent, or Firm*—Keck, Mahin & Cate

[57] ABSTRACT

The invention provides both a partial and a full vehicle body frame. In both of the frames, a front unit is connected at its lower portion to a floor unit at its front portion. A connection line of both the units tapers inward transversely as it progresses toward a front end of the floor unit.

15 Claims, 5 Drawing Sheets

VEHICLE BODY FRAME

This is a continuation of Ser. No. 08/072,384, filed on Jun. 7, 1993, abandoned.

FIELD OF THE INVENTION

The invention relates to a vehicle body frame formed by assembling divisional units each corresponding to divisions of a vehicle body frame.

RELATED ART STATEMENT

An assembling operation of a vehicle body frame has been desired so far to be much more automatized because of reduced load of workers, shortage of manpower and efficiency of the operation. For instance, when a monocoque body is furnished in a passenger's compartment with equipments such as seats, the equipments have to be carried into the compartment through openings into which doors are to be installed. Since a structure located around the openings for doors prevents a robot from carrying the equipments therethrough, such a carriage has to be done by manpower.

Japanese Patent Public Disclosure (Kokai) No. 63-235174 provides a solution to the aforementioned problem. This disclosure suggests a vehicle body frame formed by assembling units each corresponding to divisions of a vehicle body frame. In such a vehicle body frame, every unit may have a shape making the manufacture of the frame easy. As a result, a robot can be used to furnish equipments in a passenger's compartment, which facilitates to automatize an assembling of a vehicle body frame.

How to divide a vehicle body frame into units is disclosed, for instance, in Japanese Patent Public Disclosure (Kokai) No. 59-114175. In this disclosure, a vehicle body frame is divided into two units each constituting a front body and a rear body, and a floor panel is divided in parallel with a transverse axis of the vehicle body frame into a front floor portion and a rear floor portion. Both the front body unit and the rear body unit have pillars vertically extending and having closed cross-section. The front body unit is connected to the rear body unit by connecting their pillars together. The front floor portion is also connected to the rear floor portion.

However, in the aforementioned vehicle body frame, ends of the front and rear floor portions at which the two floor portions are connected are cut in straight edges, and the front and rear floor portions are merely connected at the straight edges thereof with each other. As a result, this vehicle body frame has low rigidity against vertical oscillation which the front body unit and rear body unit subsequently receive when the vehicle runs on a bumpy road. Thus, the vehicle body frame contributes little to the enhancement in the rigidity of the floor panel.

SUMMARY OF THE INVENTION

It is an object of the present invention to provide a vehicle body frame which has enough rigidity against vertical oscillation the vehicle body frame receives when a vehicle runs on a bumpy road.

The invention provides a partial vehicle body frame including a front unit for constituting a front part of a vehicle body frame, a floor unit for constituting a floor portion of a vehicle body frame, and a structure for connecting the front unit at lower portion thereof to the floor unit at front portion thereof to thereby form a partial vehicle body frame, wherein a connection of the front unit to the floor unit tapers inward transversely.

In a preferred embodiment, the floor unit is substantially rectangular in shape and has a ridge extending centrally, longitudinally of the frame to thereby form a tunnel. The front corners of the floor unit are cut back so that the corners have transverse tapers.

In another preferred embodiment, the front unit has a substantially vertically extending dash panel to which the front unit is to be connected at the center of a front end thereof.

In still another preferred embodiment, the vehicle body frame further includes a connection member for connecting the floor unit at the center of the front end thereof to the dash panel at the lower end thereof. This connection member has two plates secured to each other at an angle and extending transversely of the vehicle. The connection member is secured to a front end of a floor panel of the floor unit.

The invention also provides a vehicle body frame including a front unit for constituting a front part of a vehicle body frame, a floor unit for constituting a floor portion of a vehicle body frame, an upper unit for constituting an upper portion of a vehicle body frame, a structure for connecting the front unit at lower portion thereof to the floor unit at front portion thereof wherein a connection of the front unit to the floor unit tapers inward transversely, a structure for connecting the upper unit to both the front unit and floor unit to thereby form a vehicle body frame, a reinforcement having a closed cross-section and extending rearward of the vehicle at opposite edges of the floor unit, and a structure for connecting the reinforcement to the upper unit.

In a preferred embodiment, the upper unit includes side sills having closed cross-section and extending longitudinally at opposite ends thereof and the reinforcements are connected to the side sills at inner sides thereof.

In another preferred embodiment, the vehicle body frame further includes a bolt and a nut arranged through the side sills for connecting the reinforcements to the side sills.

In still another preferred embodiment, the bolt and nut has a spacer disposed between them and extending throughout an inner space in the side sill.

In yet another preferred embodiment, the reinforcement has a substantially triangle cross-section including a vertically extending outer panel, a horizontally extending lower panel and an inclined inner panel located inwardly of the outer panel.

In still yet another preferred embodiment, the inner panel overlaps the lower panel in an horizontal area on which the floor unit overlaps at the opposite ends and secured thereto.

In further another preferred embodiment, the connection of the front unit to the floor unit is zig-zag.

The invention also provides a vehicle body frame including a front unit for constituting a front part of a vehicle body frame, a floor unit for constituting a floor portion of a vehicle body frame, an upper unit for constituting an upper portion of a vehicle body frame, a structure for connecting the front unit at lower portion thereof to the floor unit at front portion thereof, a structure for connecting the upper unit to both the front unit and floor unit to thereby form a vehicle body frame, a reinforcement having a closed cross-section and extending rearward of the vehicle at opposite edges of the floor unit, and a structure for connecting the reinforcement to the upper unit.

The advantages obtained by the aforementioned vehicle body frame will be described hereinbelow.

As aforementioned, the vehicle body frame includes the transversely tapering connection of the front unit to the floor unit. This structure enhances the rigidity of the vehicle body frame against vertical subsequent oscillation.

In one embodiment of the invention, since the floor unit reaches the dash panel of the front unit, even when a floor mat is to be applied on the floor unit, the floor mat does not prevent the operation of connecting the front unit to the floor unit. More specifically, when a floor mat is to be applied on a floor unit, it is efficient that first the floor mat is applied on the floor unit and then the floor unit is connected to the front unit. If the floor unit does not reach the dash panel of the front unit in such a case wherein the floor unit is divided at a front end thereof and the divided portion of the floor unit is formed as a part of the front unit, the portion of the floor mat applied on the floor unit corresponding to the divided portion needs to be wound up on the floor unit. However, the portion of the floor mat may droop downward due to any shock or force the portion receives. In such a case, the portion of the mat needs to be wound up again deteriorating the efficiency of the assembling operation. The invention can avoid such a case.

The above and other objects and advantageous features of the present invention will be made apparent from the following description made with reference to the accompanying drawings.

DESCRIPTION OF THE PREFERRED EMBODIMENTS

A preferred embodiment in accordance with the invention will be explained hereinbelow with reference to drawings.

Figure 2:
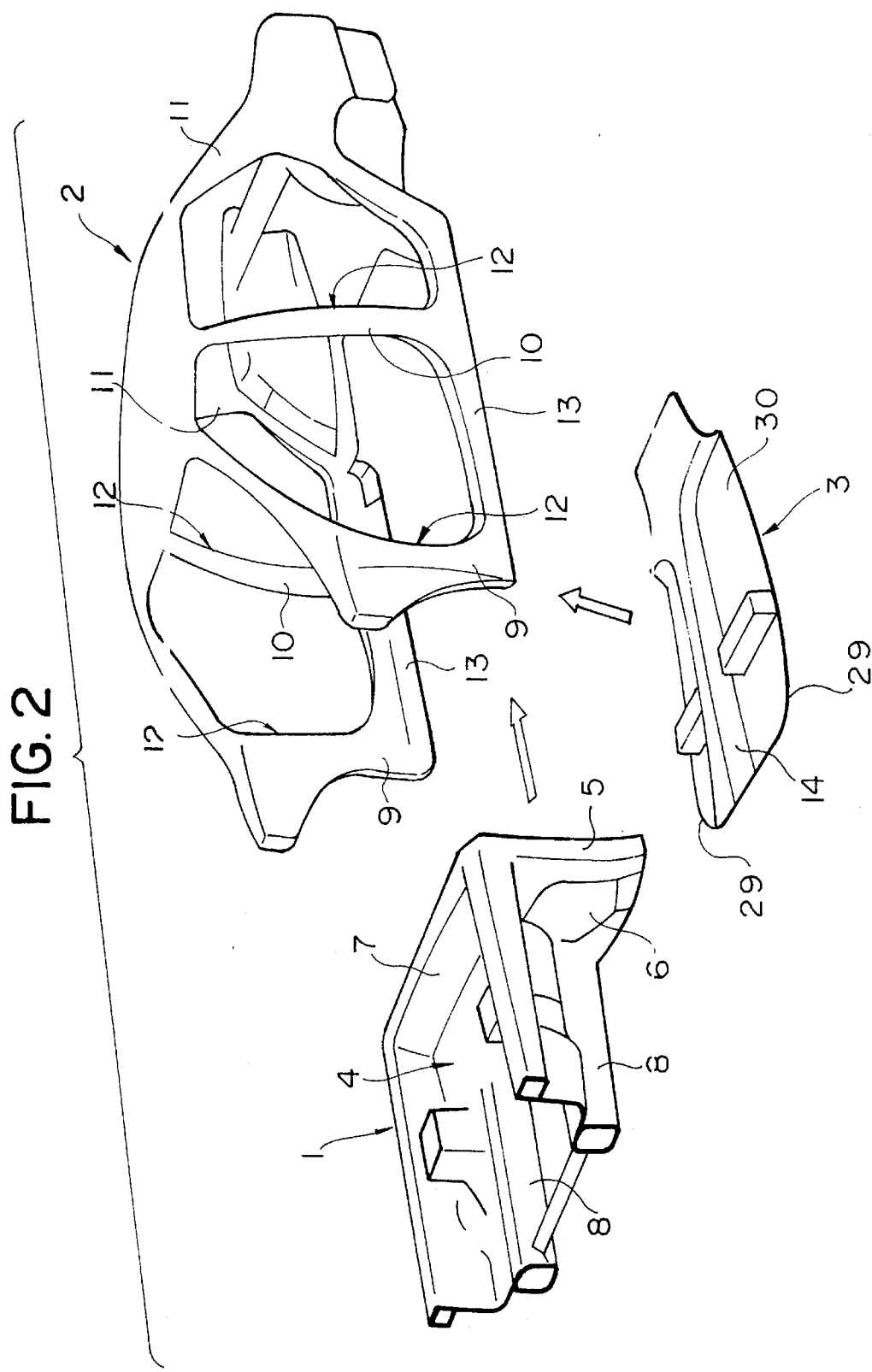
FIG. 2 is a perspective view illustrating each units of the vehicle body frame.

As illustrated in FIG. 2, a vehicle body frame in accordance with the invention includes a front unit 1 constituting a front part of a vehicle body frame, an upper unit 2 constituting a rear part and an upper part of a vehicle body frame, and a floor unit 3 constituting a floor.

The front unit 1 has an engine room 4 therein and a pair of connecting pillars 5 at opposite rear ends which have closed cross-section. The front unit 1 is formed with a pair of wheel housings 6 between the pillars 5 and a dash panel 7 extending from one of the pillars 5 to the other. In addition, the front unit 1 is provided at opposite lower ends thereof with a pair of longitudinally extending front frames 8.

The upper unit 2 has three pillars at opposite sides thereof; A-pillars 9, B-pillars 10 and C-pillars 11 positioned in this order from the front to the rear and each having closed cross-sections. The upper unit 2 also has door openings 12 into which doors are to be installed between A-pillars 9 and B-pillars 10 and B-pillars 10 and C-pillars 11. The upper unit 2 is provided at opposite lower ends thereof with longitudinally extending side sills 13.

The floor unit 3 has two rounded corners 29 at a front end thereof, a floor panel 30 and a ridge centrally, longitudinally extending to form a tunnel 14.

Figure 1:
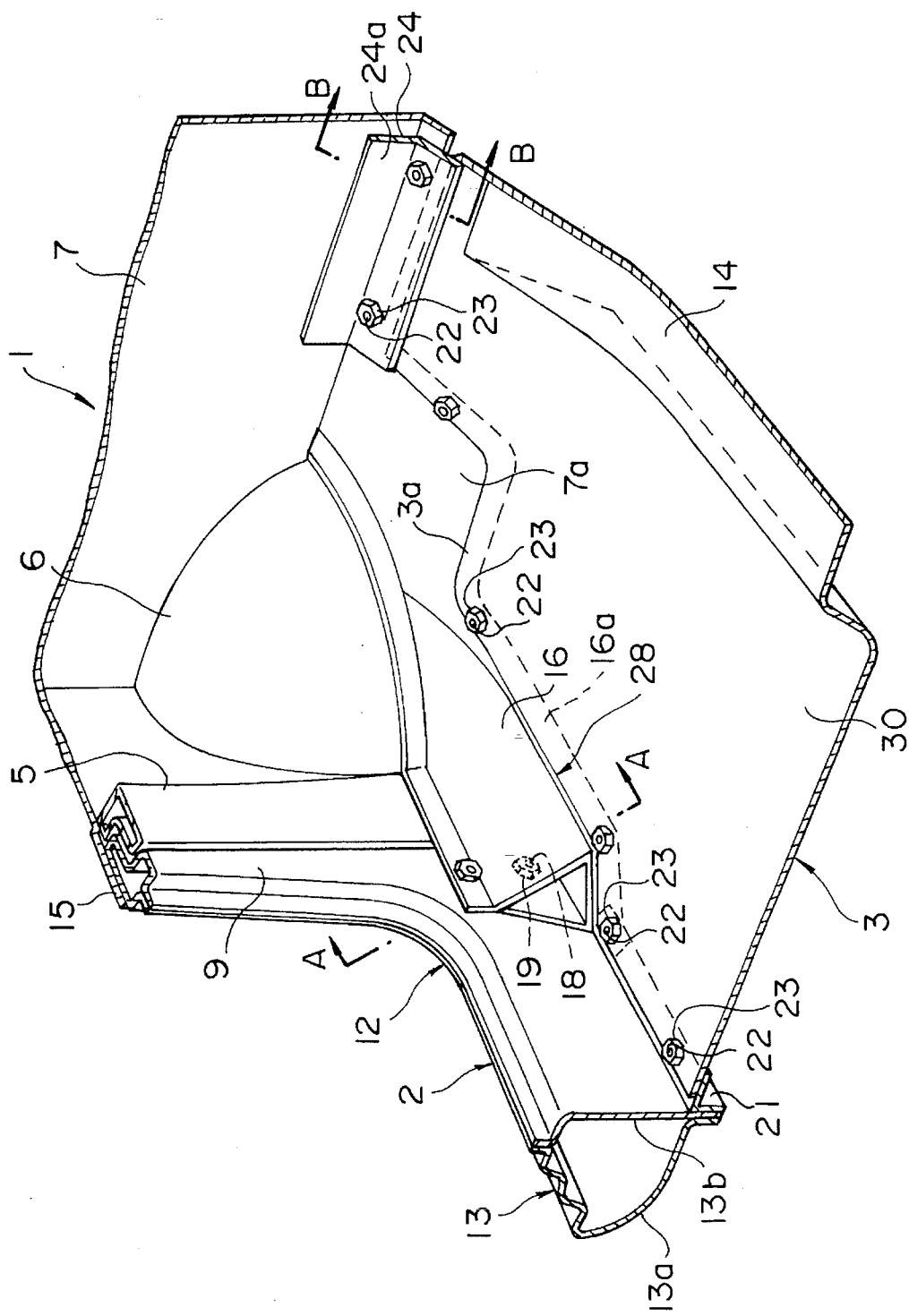
FIG. 1 is a partial perspective view of an embodiment in accordance with the invention.

FIG. 1 illustrates a structure for connecting the front unit 1, the upper unit 2 and the floor unit 3 together. Both the connecting pillar 5 of the front unit 1 and the A-pillar 9 of the upper unit 2 have L-shaped cross-section to fit with each other. With the pillar 5 being fit into the A-pillar 9, they are connected by means of a bolt and nut through a connecting panel 15 provided on exterior surfaces of both of the pillars. The A-pillar 9 is formed integrally with a side sill 13. The front unit 1 is provided with a torque box 16 as a reinforcement which is connected to the side sill 13 at a front end thereof. The torque box 16 having closed triangle cross-section extends rearward from opposite ends of the front unit 1 and is connected at its front end to the front frame 8 so that the torque box 16 has high strength.

Figure 3:
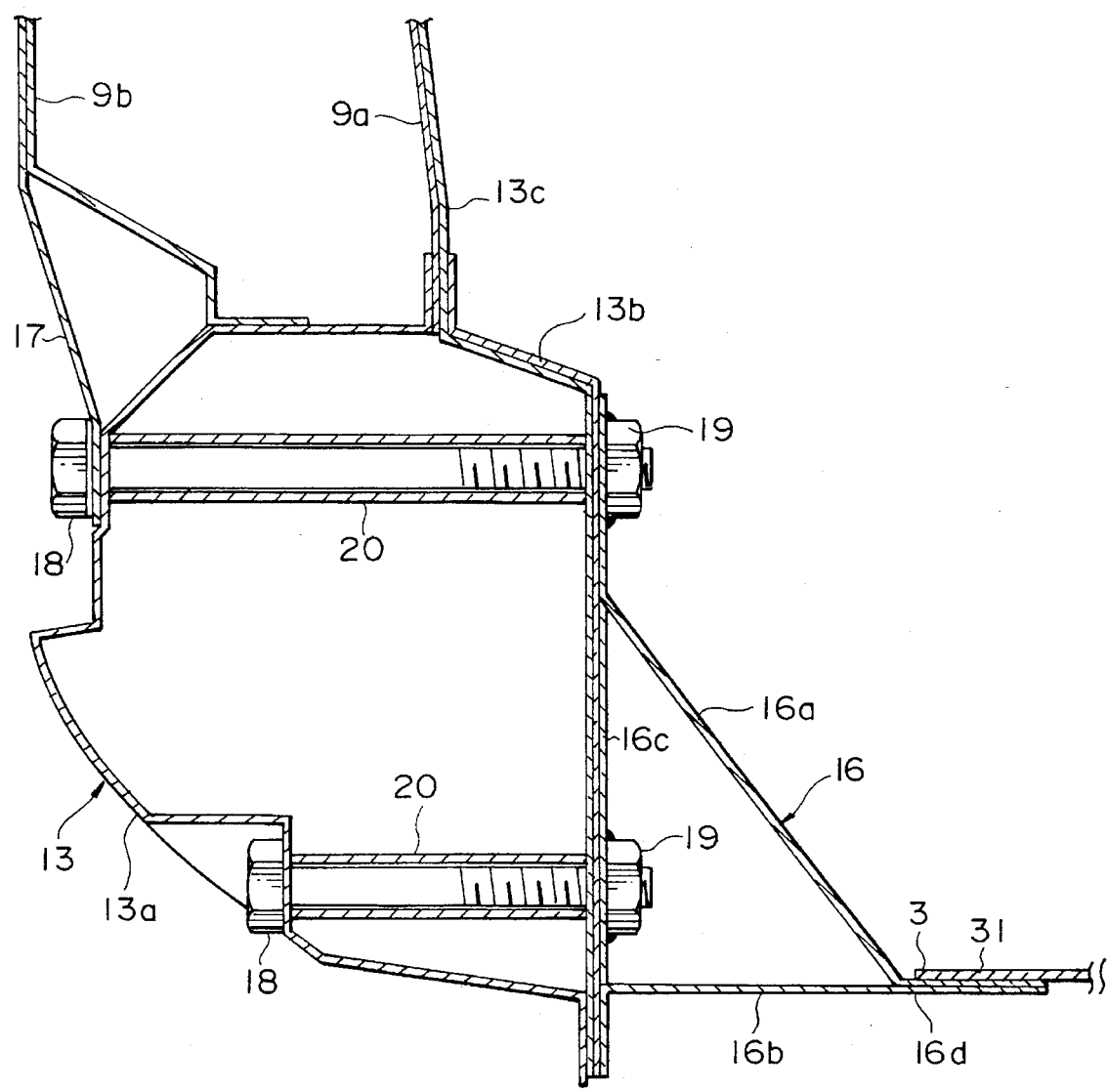
FIG. 3 is a cross-sectional view taken along the line A—A in FIG. 1.

FIG. 3 illustrates the structure of the torque box 16 and the side sill 13 to which the torque box 16 is connected. As illustrated, the torque box 16 comprises an inner surface 16a, a lower surface 16b and an outer surface 16c. The side sill 13 comprises an outer surface 13a, an inner surface 13b and a reinforcement 13c located at the side of the inner surface 13b. From the side sill 13 upward extend an inner wall 9a and an outer wall 9b both constituting the A-pillar 9, a cowl side panel 17 and the reinforcement 13c of the side sill 13. The torque box 16 is connected to the side sill 13 by means of a plurality of bolts 18 and nuts 19. The side sill 13 is reinforced with a spacer 20 through which the bolt 18 is inserted in an inner space of the side sill 13.

As illustrated in FIG. 1, a longitudinally extending L-shaped flange 21 is secured to the inner surface 13b of the side sill 13. The floor unit 3 is connected at opposite longitudinal ends thereof to the L-shaped flange 21 by means of bolts 22 and nuts 23 thereby to connect the floor unit 3 to the front unit 1. Between the flange 21 and the floor unit 3 is provided an adhesive layer (not shown) for sealing. In an area 31 where the front unit 1 is connected to the floor unit 3 at its periphery, the floor unit 3 is connected at its peripheral end 3a to both a flange portion 16d formed with the torque box 16 and a floor panel portion 7a extending from a lower end of the clash panel 7 toward the floor unit 3 by means of the bolts 22 and nuts 23 as well as an adhesive layer (not shown).

It should be noted that the peripheral end 3a of the floor unit 3 does not extend merely transversely nor longitudinally, but extends in a zig-zag fashion toward the front end of the floor unit 3. That is, the peripheral end 3a of the floor unit 3 tapers inward and transversely of the vehicle. A line 28 represents where the floor unit 3 is connected to the front unit 1.

Figure 4:
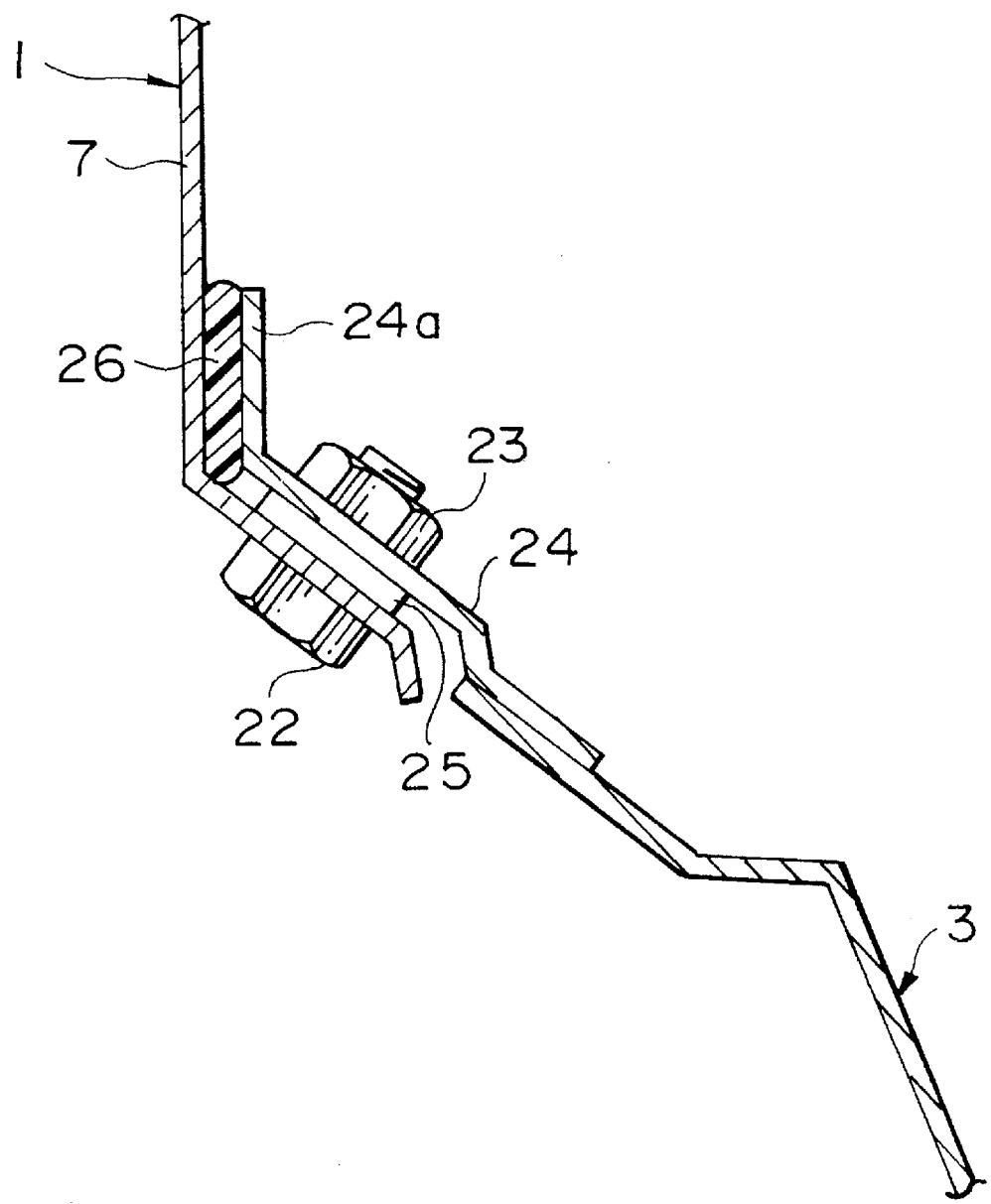
FIG. 4 is a cross-sectional view taken along the line B—B in FIG. 1.

The floor unit 3 is connected at the front end thereof to the dash panel 7 of the front panel 1 through a connecting plate 24. As illustrated in FIG. 4, the plate 24 is welded to the floor unit 3 at one end and is connected at opposite end to the dash panel 7 by means of the bolts 22 and the nuts 23 with washers 25 therebetween for not loosening the nuts 23. The plate 24 has a front portion 24a facing and in parallel with the dash panel 7. An adhesive layer 26 for sealing is applied on the front portion 24a.

Figure 5:
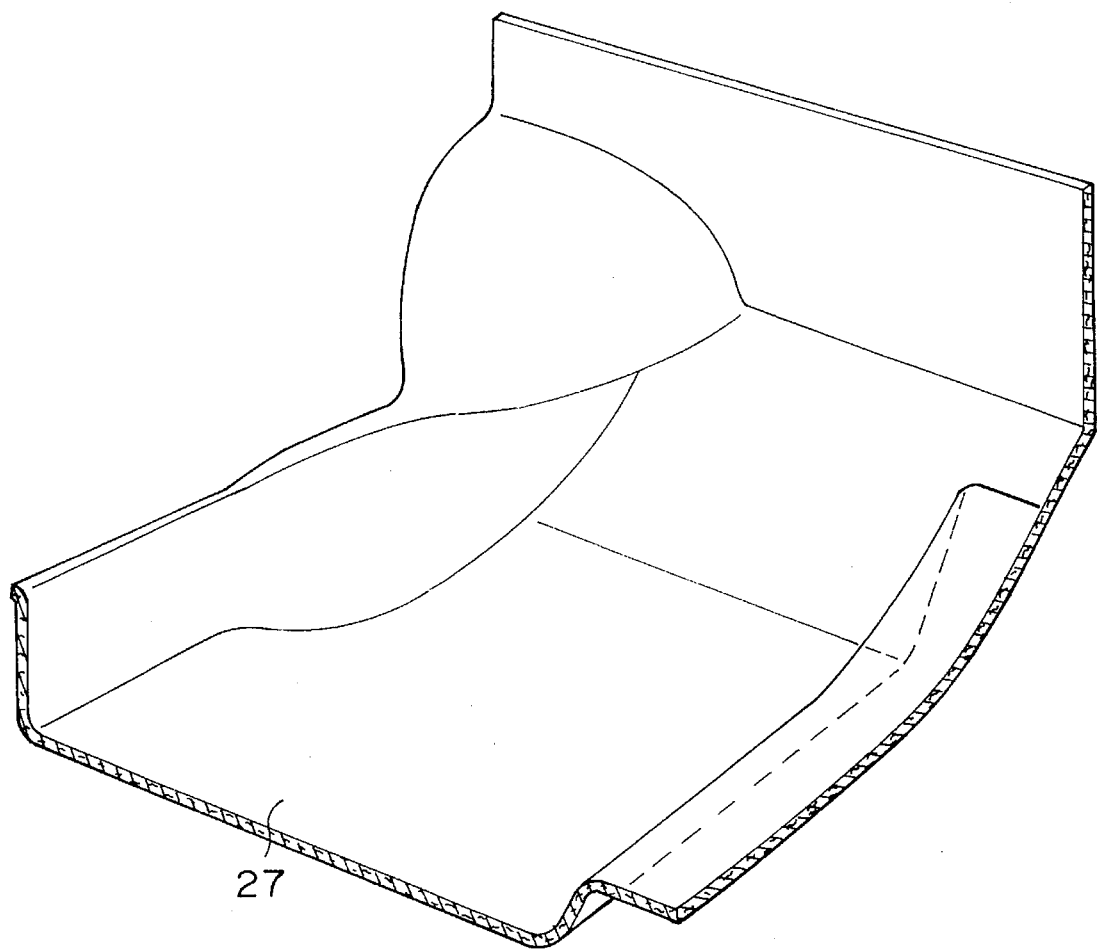
FIG. 5 is a perspective view illustrating a floor mat to be applied on the floor unit illustrated in FIG. 1.

A floor mat 27 illustrated in FIG. 5 is applied on the floor panel 30 of the floor unit 3.

As aforementioned, in the vehicle body frame, the peripheral end 3a of the floor unit 3a at which the floor unit 3 is connected to the front unit 1 tapers inward, transversely of the vehicle as it progresses toward the front end of the floor unit 3. This structure provides higher rigidity against vertical oscillation which the front unit 1 and the floor unit 3 subsequently receives when the vehicle runs on a bumpy road than the aforementioned conventional structure wherein the floor unit 3 is connected to the front unit 1 by merely connecting straightly and transversely extending ends of both the units.

The torque box 16 having high rigidity due to the closed cross-section is provided where the front unit 1 is connected to the upper unit 2 or across both the connecting pillar 5 and the A-pillar 9, as aforementioned. Since the floor unit 3 is connected to both the front unit 1 and the upper unit 2, higher rigidity is provided where the three units 1, 2, 3 are connected together.

Further, since the floor unit 3 reaches the dash panel 7 forming a vertical wall of the front unit 1, the operation of connecting the floor unit 3 to the front unit 1 can be achieved efficiently. Specifically, as aforementioned, even if the floor mat 27 is applied on the floor panel 30 in advance, this structure in accordance with the invention can prevent the floor mat 27 from drooping at its front end and accordingly it is not necessary to wind up the floor mat 27.

The connecting plate 24 for connecting the floor unit 3 to the dash panel 7 of the front unit 1 has the front portion 24a parallel to the dash panel 7. Since the adhesive layer 26 is to be provided on the front portion 24a, it is easy to appropriately position the adhesive layer 26. Specifically, in this specific embodiment, when the floor unit 3 is connected to the front unit 1, the front unit 1 is straightly moved to a predetermined position facing the floor unit 3. If the adhesive layer 26 is provided to both an inclined portion located below the front portion 24a and an inclined portion of the dash panel 7 facing the inclined portion of the plate 24, the adhesive layers 26 are not aligned with each other because of movement of the dash panel 7, resulting in that reliable sealing cannot be assured at a predetermined position. On the other hand, in this embodiment, the adhesive layer 26 is compressed and spread wide due to the movement of the front unit 1 resulting in that a reliable sealing can be assured at a predetermined position between the dash panel 7 and the portion 24a of the plate 24.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

What is claimed is:

1. A partial vehicle body frame comprising:
    a front unit constituting a front part of the vehicle body frame;
    a floor unit constituting a floor portion of the vehicle body frame; and
    connecting means, including bolts, for connecting said front unit at a lower portion thereof to said floor unit at a front portion thereof to form a partial vehicle body frame;
    said front unit having a substantially vertically extending dash panel to which said floor unit is to be connected at a center of a front end thereof;
    said dash panel being formed with a pair of floor panel portions extending rearwardly at opposite sides thereof;
    each of said floor panel portions extending horizontally, rearwardly and parallel to the floor portion of the vehicle body frame from a lower side of right and left portions of the substantially vertically extending dash panel; and
    a connection of said floor panel portions of said dash panel to front opposite ends of said floor unit extending forwardly and inwardly.

2. A partial vehicle body frame in accordance with claim 1, wherein said floor unit is substantially rectangular in shape and has a ridge extending centrally, longitudinally of the frame to thereby form a tunnel, front corners of said floor unit being cut back so that the corners extend forwardly and inwardly.

3. A partial vehicle body frame in accordance with claim 1, wherein said connecting means further includes a connecting panel for connecting said floor unit at the center of the front end thereof to said dash panel at the lower end thereof, said connecting panel extending transversely of the vehicle and being secured to a front end of one of said floor panel portions of said dash panel.

4. A partial vehicle body frame in accordance with claim 3, wherein said connecting means further includes an adhesive layer provided between said connecting panel and said dash panel.

5. A vehicle body frame comprising:
    a front unit constituting a front part of the vehicle body frame;
    a floor unit constituting a floor portion of the vehicle body frame;
    an upper unit constituting an upper portion of the vehicle body frame;
    connecting means, including bolts, for connecting said front unit at a lower portion thereof to said floor unit at a front portion thereof;
    means for connecting said upper unit to both said front unit and said floor unit to thereby form the vehicle body frame;
    at least one reinforcement extending rearward of the vehicle and secured to said floor unit at each of opposite lower ends of said floor unit; and
    means for connecting said at least one reinforcement to said upper unit;
    said front unit having a substantially vertically extending dash panel to which said floor unit is to be connected at a center of a front end thereof;
    said dash panel being formed with a pair of floor panel portions extending rearwardly at opposite sides thereof; and
    a connection of said floor panel portions of said dash panel to said front opposite ends of said floor unit extending forwardly and inwardly;
    wherein said upper unit includes side sills, each having a closed cross-section and extending longitudinally, at opposite ends thereof, each reinforcement being connected to one of said side sills at an inner side thereof, each of the side sills having inner and outer sides, each reinforcement connecting both one of the inner sides of one of the side sills and one of the floor panel portions of the dash panel.

6. A vehicle body frame in accordance with claim 5, wherein said reinforcement has a closed cross-section.

7. A vehicle body frame in accordance with claim 5 further comprising bolt means arranged through said side sills for connecting the reinforcements to said side sills, said bolt means including a bolt extending through the inner and outer sides of the side sills.

8. A vehicle body frame in accordance with claim 7, wherein said bolt means have spacers disposed between bolts and nuts and extending throughout inner spaces in said side sills.

9. A vehicle body frame comprising:

a front unit constituting a front part of the vehicle body frame;

a floor unit constituting a floor portion of the vehicle body frame;

an upper unit constituting an upper portion of the vehicle body frame;

means for connecting said front unit at a lower portion thereof to said floor unit at a front portion thereof;

means for connecting said upper unit to both said front unit and said floor unit to thereby form the vehicle body frame;

at least one reinforcement extending rearward of the vehicle and secured to said floor unit at each of opposite lower ends of said floor unit, each reinforcement having a substantially triangular cross-section including a vertically extending outer panel, a horizontally extending lower panel and an inclined inner panel located inwardly of the outer panel; and means for connecting said at least one reinforcement to said upper unit;

said front unit having a substantially vertically extending dash panel to which said floor unit is to be connected at a center of a front end thereof;

said dash panel being formed with a pair of floor panel portions extending rearwardly at opposite sides thereof; and a connection of said floor panel portions of said dash panel to said front opposite ends of said floor unit extending forwardly and inwardly.

10. A vehicle body frame in accordance with claim 9, wherein said inner panel overlaps said lower panel in an area on which said floor unit overlaps at the opposite lower ends and is secured thereto.

11. A vehicle body frame comprising:

a front unit constituting a front part of the vehicle body frame;

a floor unit constituting a floor portion of the vehicle body frame;

an upper unit constituting an upper portion of the vehicle body frame;

means for connecting said front unit at a lower portion thereof to said floor unit at a front portion thereof;

means for connecting said upper unit to both said front unit and said floor unit to thereby form a vehicle body frame;

at least one reinforcement extending rearward of the vehicle and secured to said floor unit at opposite lower ends of said floor unit; and means for connecting said at least one reinforcement to said upper unit, wherein said at least one reinforcement has a substantially triangular cross-section including a vertically extending outer panel, a horizontally extending lower panel and an inclined inner panel located inwardly of the outer panel.

12. A vehicle body frame in accordance with claim 11, wherein said upper unit includes side sills having closed cross-sections and extending longitudinally at opposite ends thereof and each reinforcements is connected to said side sills at inner sides thereof.

13. A vehicle body frame in accordance with claim 12 further comprising bolt means arranged through said side sills for connecting each reinforcements to said side sills.

14. A vehicle body frame in accordance with claim 13, wherein said bolt means have spacers disposed between bolts and nuts and extending throughout inner spaces in said side sills.

15. A vehicle body frame in accordance with claim 11, wherein said inner panel overlaps said lower panel in a horizontal area on which said floor unit overlaps at the opposite lower ends and is secured thereto.

* * * * *